United States Patent Office 3,427,156
Patented Feb. 11, 1969

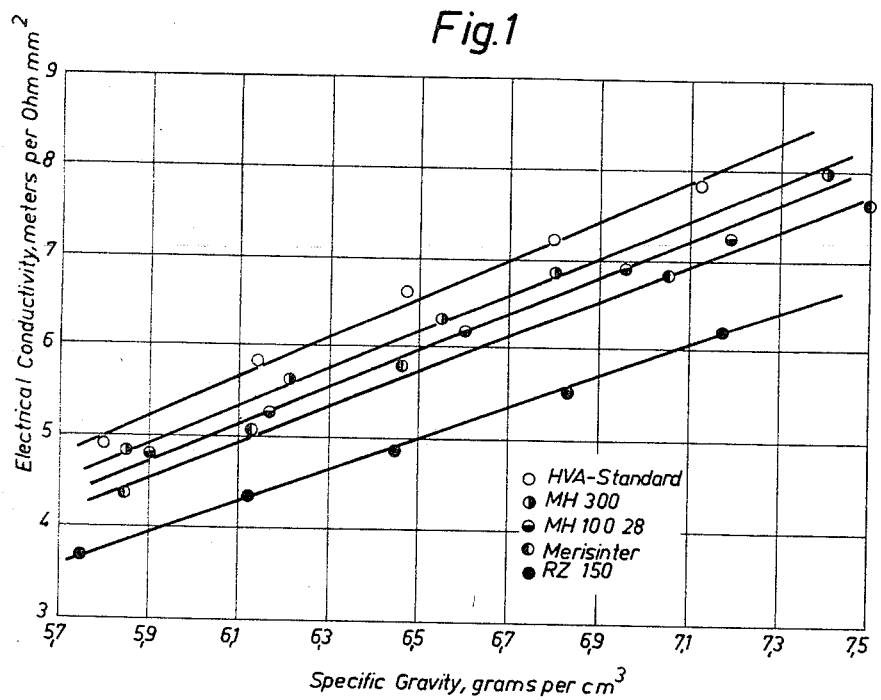
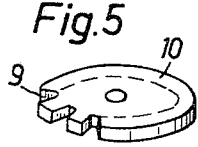
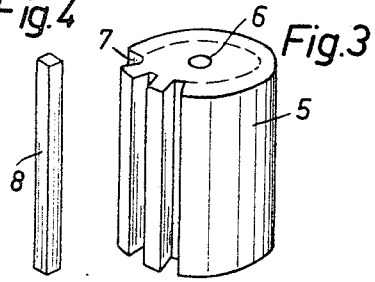
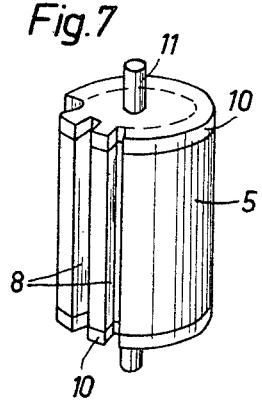
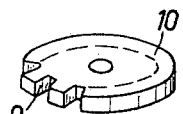

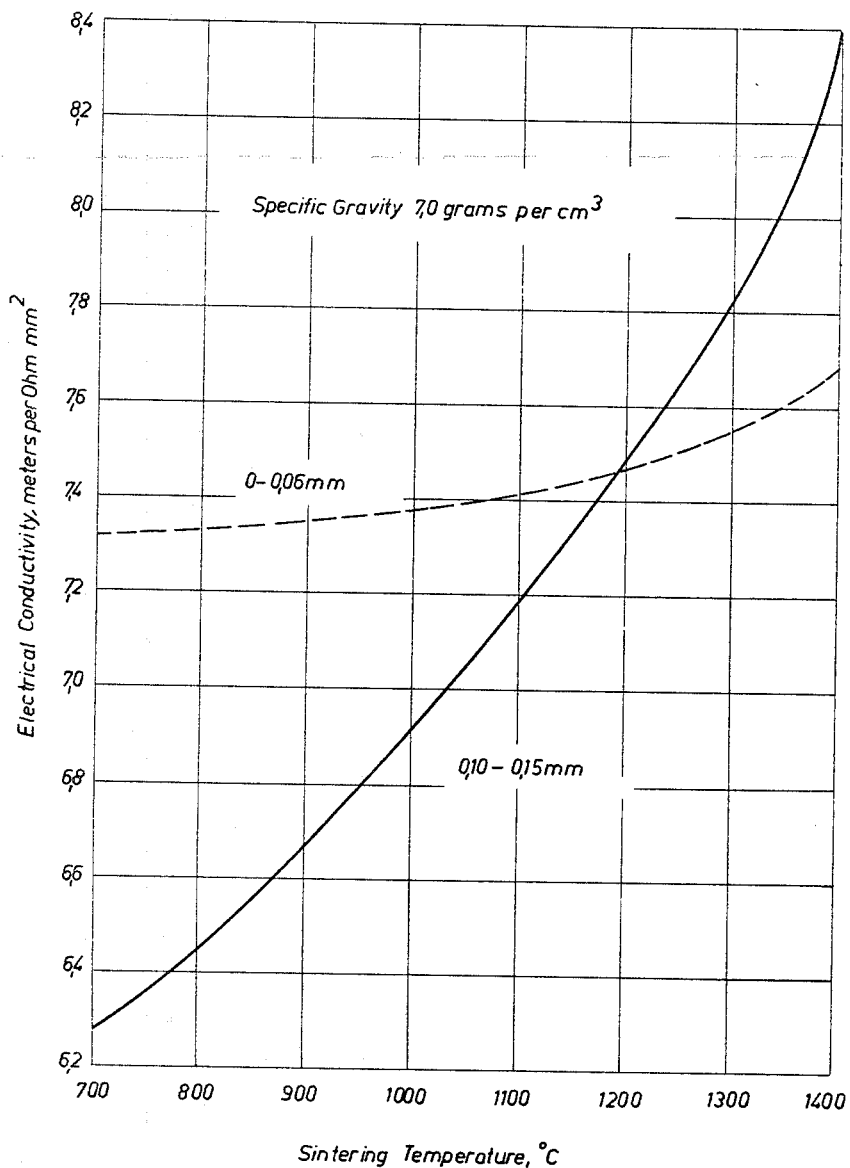

3,427,156
SINTERING METHOD AND ARTICLE
MANUFACTURED THEREBY
Rudolf Reinstadler, Burghaun, Kreis Hunfeld, Germany, assignor to Sintermetallwerk Krebsoge G.m.b.H., Krebsoge, Rhineland, Germany, a corporation of Germany
Filed Dec. 14, 1965, Ser. No. 513,744
Claims priority, application Germany, Dec. 22, 1964, S 94,768
U.S. Cl. 75—214       5 Claims
Int. Cl. B22f 3/12

ABSTRACT OF THE DISCLOSURE

Sintering method for manufacturing a body of relatively low electrical conductivity and high saturation induction includes the step of sintering at a temperature of between about 700° C. and 1150° C. a sinter blank consisting essentially of an iron powder having a particle size of from about 0.06 to about 0.4 mm.

SPECIFICATION

My invention relates to the art of sintering.

In particular, my invention relates to the sintering of bodies which are adapted to be used for electrical purposes.

It is already known to use a sintering method for the manufacture of bodies which are designed for use in magnetic circuits in which an alternating field operates. Such sintered bodies replace the otherwise conventional laminated assemblies composed of a stack of metal plates. For example, sintered bodies of this type can be used to form cores of the rotors of small electric motors.

Because of the iron loss in the alternating field, it is important that cores of this type have a relatively low electrical conductivity, and therefore it is conventional to add to the iron powder used to form the sintered body an electrically non-conductive material which will increase the ohmic resistance of the resulting sintered body. This expedient is in conflict, however, with the equally important requirement that the body have a relatively high magnetic saturation induction, aside from the fact that the use of such additives prohibit the brazing or sintering of components, such as parts of a squirrel cage rotor, at high temperatures.

The sintered bodies which have been achieved according to conventional methods, whether or not the iron particles have been combined with electrically non-conductive additives, have not proved to be of sufficiently high quality to compensate for the manufacturing costs involved in the sintering methods. Thus, with conventional electric motors which have been provided with rotors having sintered cores, it is possible at best to provide a synchronous maximum torque which is no greater than that which can be achieved using a conventional laminated rotor core.

It is a primary object of my invention to provide a sintering method and article which do indeed compensate, because of the high quality which can be achieved with my invention, any manufacturing costs involved in the sintering method and thus in the cost of the article produced thereby.

In particular, it is an object of my invention to provide a sintering method and article capable of producing a sintered body of relatively low electrical conductivity without requiring the use of any electrically non-conductive additives.

Furthermore, it is an object of my invention to provide a sintering method which can be carried out without the application of any substantial compression to the sinter blank.

Yet another object of my invention is to provide a sintering method and article which initially includes iron powder particles whose size range is relatively limited.

Also, the objects of my invention include the provision of a sintered body of relatively low specific weight.

Furthermore, my invention includes the object of providing a sintered body which can be very accurately manufactured so as to conform to required dimensions and configurations and which at the same time can be united with other components such as the rods of a squirrel cage rotor without any difficulties such as those normally encountered in the requirement that no high temperatures be used as the result of the presence of additives of electrically non-conductive materials.

With my invention a sintering method is used to manufacture a body of relatively low electrical conductivity and relatively high saturation induction, and this sintering method includes the step of sintering at a temperature range of between about 700° C. and 1150° C. a sinter blank which includes iron powder having particles in a size range of from about 0.06 to about 0.4 mm.

My invention is explained below in connection with the drawings which form part of this application and in which:

FIG. 1 is a graph illustrating known relationships between electrical conductivity and specific weight of various iron powders; and FIG. 2 is a graph illustrating the discovery of physical properties upon which my invention is based.

FIGS. 3 to 6 are perspective illustrations of respective components of a squirrel-cage rotor made according to the invention, and FIG. 7 shows the same rotor in assembled condition.

My invention is based upon recognition of the fact that significantly improved results can be achieved by sintering in such a way that there is a considerable departure from prevailing conceptions of proper sintering techniques and in fact if in part these known conceptions of sintering techniques are directly opposed. The discovery of my invention is based on the uncovering of certain relationships, which in the meantime have been experimentally confirmed, between the particle size of the metal powder used for the sintered body and the sintering temperature, on the other hand, and the electrical conductivity of the sintered body, on the other hand. (It is to be understood that in referring to particle size the size of the initial powder particles is intended and not the size of the grains of the crystallite.)

The physical relationships which have been proved according to the new discovery are explained in connection with graphical illustrations. It should be noted, however, that according to old investigations and prevailing conceptions there is a linear relationship between the density and the electrical conductivity of a sintered body. In particular, investigations carried out by Squire support the existence of such relationships. Thus, referring to FIG. 1, there are graphically illustrated therein the electrical conductivity of five different sintered bodies composed of different iron powder compositions, as indicated where the electrical conductivities are plotted against the specific weight. The sintered bodies were sintered at a temperature of 1200° C. for a period of 120 minutes in hydrogen.

As for the influence of the sintering temperature, the statements made by Kieffer and Hotop in their work "Sintereisen und Sinterstahl," 1948, lead to the conclusion that the electrical conductivity increases with an increase in the sintering temperature. This conclusion is at least indirectly apparent from FIG. 94, on page 199, of the above work. Kieffer and Hotop also make certain statements with respect to the influence of particle size on the electrical conductivity. Thus, there appears on page 139: "The influence of particle size and shape is very clearly apparent from the example of iron carbonyls. Although this iron has an outstanding purity, it nevertheless has an extremely high electrical resistance. This high electrical resistance results from the fact that a reduction in particle size gives much more of an increase in electrical resistance than a chemical impurity because with the reduction in the size of the particles the number of points of engagement between the particles greatly increases." The above mentioned FIG. 94 on page 199, does not, however, provide any mathematical relationship between the size of the particles of the metal powder and the electrical conductivity of the sintered body, even at a sintering temperature of 1200° C.

According to theories developed up to the present time, the degree of electrical conductivity must be smaller as the size of the particles of iron powder used for the sintered body become smaller. This concept has in fact dominated the thinking in the field of powder metallurgy, because it coincides with experience and theories in the field of molten metallurgy. In the metallurgy of molten metals it is indeed true that the rule that the electrical conductivity is smaller as the number of boundaries between the grains of the metal structure become larger, is fully applicable. In other words, the finer the granular structure of the metal bodies made from molten metal, the less the degree of electrical conductivity. Thus, in accordance with the above theories in the manufacture of sintered bodies which are required to have a small degree of electrical conductivity, it has been considered essential to choose powder of the smallest possible particle size.

The investigations on which my invention is based have confirmed the theories which prevail at the present time for the case where the standard sintering temperature is 1200° C. as well as for higher temperatures. Thus, in agreement with FIG. 94 of Kieffer and Hotop, when a body has been sintered at a temperature of 1200° C., the conductivity thereof is not appreciably dependent upon the size of the particles. Indeed, FIG. 94 of Kieffer and Hotop do not lead to any conclusion with respect to particle size, inasmuch as the specific weights of the sintered bodies are not mentioned. Reference is made in the text of Kieffer and Hotop to the fact that different sintering processes as well as chemical impurities in the metal powder and the residual porosity thereof, will influence the electrical conductivity. Very thorough investigations have indicated that with sintering temperatures higher than approximately 1200° C., when relatively large particles of iron powder are used higher degrees of electrical conductivity will be achieved than when relatively fine particles of iron powder are used. This experience coincides with the current theories.

In contrast, however, it has been found, most surprisingly, that at sintering temperatures below 1200° C. the physical relationship are precisely reversed with respect to those which have been assumed up to the present time, partly based on Kieffer and Hotop, and partly in accordance with the analogy to the metallurgy of molten metals. It has been found, namely, that below a sintering temperature of 1200° C. and to a very marked degree below 1100° C., larger particles of iron powder will provide a lesser degree of electrical conductivity than smaller particles of powder.

This physical property is illustrated in FIG. 2 for sintered bodies having a specific weight of 7.0 g./cm.$^3$, where the electrical conductivity is plotted against the sintering temperature for two iron powders of different degrees of fineness but treated according to the very same manufacturing method. The two curves of FIG. 2 intersect at approximately 1200° C. To the right of the intersection of the curves, it will be seen that these curves confirm the presently believed conceptions with respect to different degrees of particle size. However, to the left of the intersection of the two curves it will be seen that in the region of relatively low sintering temperatures the presently prevailing theories are incorrect.

The relationship which is clearly demonstrated, for the first time according to my invention, by the left portion of FIG. 2, provides a solution for the problem mentioned above in connection with the manufacture of a sintered body of relatively low electrical conductivity and at the same time a relatively high degree of magnetic saturation induction. It is clear that simply by choosing the particle size of the metal powder which is used for the sintered body and the sintering temperature, it is possible to lower the electrical conductivity while at the same time maintaining a high magnetic saturation induction, because the saturation induction, assuming the same densities of the sintered bodies, will not depend upon the particle size of the metal powder or upon the temperatures used for sintering.

Extensive tests have shown that sintered bodies in which the range of sizes of the particles of the metal powder is very limited, have a relatively low degree of electrical conductivity. However, by screening out a narrowly limited range of particle sizes, the extent to which the body of particles can be compacted and the resistance of the particles to deformation at their edges, in the sinter blank which has not yet been actually sintered, are reduced undesirably, so that for these reasons it is customary in actual sintering practice to use a metal powder in which the range of sizes of the particles is rather wide, and in which primarily relatively fine particles will be missing.

My invention also recognizes the fact that it is possible to manufacture sintered iron cores which are particularly suited for use in alternating fields by providing no appreciable compacting of the body during sintering thereof. Thus, the primary features of the method of my invention are that by choice of a suitably low sintering temperature or by choice of a relatively short sintering time, or even better, by simultaneous use of both of these expedients, the sintering can be carried out in such a way that between the individual particles of iron powder there will be no deformation forming bridges of fusion between the particles, so that with my invention during the sinternig there is no measurable shrinkage of the body which is sintered. This result can be achieved with my invention by using in the sintering blank an iron powder whose particle size is from 0.06, approximately, to about 0.4 mm., preferably between about 0.1 and 0.3 mm., while sintering in a conventional sintering atmosphere at a temperature of between about 700° C. and 1150° C. for a relatively short time. The combination of these expedients of my invention does not correspond to the conventional sintering techniques, where it is customary to use a powder of 0 to 0.15 mm., in the range of its particle size, and where the sintering temperature is conventionally about 1200° C.

In carrying out the method of my invention, initially, by fractionated screening, an iron powder is achieved in which the range of particle sizes has upper and lower limits. Primary the finest particles are screened out. In contrast, according to presently prevailing technical opinion, it is precisely the presence of these fine particles which will lead to a low degree of electrical conductivity.

As for the choice of a sintering temperature within the range called for by my invention, a temperature in the region of the lower limits of this range will be chosen in those cases where the sintered bodies will be subjected to little or no mechanical stresses. This choice will be made mostly for stationary cores, although to a certain extent also for cores of squirrel cage rotors where the cores can be suported against the cage as a result of the centrifugal forces. However, in those cases where a relatively high mechanical strength is an important consideration, a sintering temperature in the region of the upper limit of the range of my invention will be chosen.

Practical experience has demonstrated, in accordance with my invention, that in the manufacture of sintering blanks it is best to compress the body of particles so as to provide a sintering blank which has a specific weight of from 6.0 to 7.0 g./cm.$^3$, approximately, and to use a sintering temperature which will provide no measurable shrinkage.

It is possible to provide a further improvement by cold-forming the body after it has been sintered, and at best to such an extent that the volume of the body will be reduced, as a result of the cold deformation thereof, by approximately 2%. As a result of this cold-forming of sintered body, the electrical conductivity thereof is additionally reduced, and the saturation induction is increased in correspondence with the additional compacting. The electrical conductivity drops as a result of the cold-forming because the bridges which form between the individual particles during sintering are stressed in the plastic deformation region during cold-forming and are in part broken. The additional compacting which will result from cold-forming should not, in accordance with my invention be carried out to such an extent that the upper density limit exceeds approximately 7.3 g./cm.$^3$, because in this event, as a result of the higher specific weight, the electrical conductivity can again increase and as a result of the plastic deformation, which has its action primarily limited to the bridges between the individual particles, there will be an undesired drop in mechanical strength of the sintered body which in any event is not very strong in a mechanical sense.

The cold compacting of the sintered body can serve at the same time for calibration purposes, so that the resulting body can be manufactured to accurate dimensions. For example, if the body which is manufactured according to my invention is to have a cylindrical configuration, such as that of the core of the rotor of an electric motor, then the body, before cold deformation thereof, will be placed in a mold or form having the required radial dimensions and the pressure of a suitable ram or plunger will be axially applied to the body so as to reduce the axial length thereof while causing the body to become more compact and to conform to the radial dimensions of the mold or form.

In order to further explain my invention, two specific examples follow, in which articles to be used in connection with small electric squirrel cage motors are manufactured:

Example I

From a commercially available electrolytic iron powder having a maximum particle size of 0.15 mm., the relatively fine particles were removed by screening up to a particle size of 0.1 mm., so that the remaining iron powder had a particle size range of from 0.1 to 0.15 mm. This powder was compacted in a suitable mold which had the configuration of the core of the electric motor, and the compacting was carried out at room temperature so as to provide a sintering blank having a specific weight of from 6.0 to 6.1 g./cm.$^3$. This sintering blank was then subjected for a period of 10 minutes to a temperature of 900° C. without any compressive forces applied thereto, and in this way the blank was sintered. Then the rods of the squirrel-cage windings were introduced into the slots of the thus sintered body and the end-turn connectors of the squirrel-cage winding were mounted on these rods. The entire assembly was then again subjected to a temperature of 900° C., without the application of any compressive forces whatsoever, but this time for a period of 30 minutes, and finally the resulting structure was cold-compacted in a suitably shaped mold to such an extent that the volume of the sintered body was reduced by 2%.

In this example the second heating of the assembly in which the already sintered iron core was heated for a second time was for the purpose of providing an electrically conductive connection between the rods and the end-turn connectors of the squirrel-cage winding, either by sintering of the copper or by brazing. This phase of the manufacturing process has nothing to do with my invention. A small motor provided with a rotor manufactured in the above manner will produce a maximum synchronous torque which is about 23% higher than the maximum synchronous torque of a corresponding motor whose rotor core consists of an assembly of metal laminations.

Example II

From sponge iron powder having a maximum particle size of 0.3 mm., the finest portion of the iron particles, up to a size of 0.1 mm., was separated out by screening, so that the remaining powder had a particle size range of from 0.1 to 0.3 mm. From this powder a sintering blank was compacted in such a way that the specific weight thereof was 6.5 g./cm.$^3$. This sintering blank was then sintered for a period of ten minutes in an atmosphere of dissociated ammonia gas at a temperature of 950° C. Then the squirrel-cage winding elements were mounted on the sintered body and the entire assembly was subjected to a temperature of 1000° C. for 30 minutes. This latter heating was followed by cold-compacting to provide calibration of the structure to the desired dimensions as well as a reduction in the volume thereof of 2%, in the same way as in Example I.

An electric motor provided with a rotor manufactured in this way, whose stator corresponds to that of the motor mentioned in Example I, provides under the same electrical conditions a maximum synchronous torque which again is about 23% higher than the maximum synchronous torque of a corresponding motor, whose rotor core consists of metal laminations.

From the large number of factors presented above, the following four examples were derived, of which the examples (3) and (4) correspond to Examples I and II:

|   | Mm. |
|---|---|
| (1) Electrolytic iron powder | Smaller than 0.06. |
| Synchronous maximum torque | 12.5. |
| (2) Electrolytic iron powder | Smaller than 0.15 |
| Synchronous maximum torque | 13.5. |
| (3) Electrolytic iron powder | 0.1 to 0.15. |
| Synchronous maximum torque | 18.5. |
| (4) Hoganas sponge iron powder W 4024 K. | 0.10 to 0.30. |
| Synchronous maximum torque | 18.5. |

The above values for the maximum synchronous torque are scale values read from a measuring instrument which increases only proportional values of the torque, which cannot be given in units of measurement, but which of course are comparable with one another on a percent basis.

The embodiment of a squirrel-cage rotor according to the invention shown in FIGS. 3 to 7, comprises an iron core 5 composed and produced in accordance with any of the examples described above. The core 5 has a central bore 6 and longitudinal slots 7 uniformly distributed over the periphery. The slots serve to receive conductor rods 8 of copper. The rods 8 extend axially on both sides beyond the core 5 and have their respective ends engaged by two toothed plates 10 of copper which, together with the rods, form the squirrel-cage windings of the completed rotor. FIGS. 3 to 6 show the parts of the rotor in exploded fashion, and FIG. 7 shows them assembled but without the conductor rods.

I claim:

1. Method of producing a sintered body of relatively high density so as to have a relatively high saturation inductance for use in a magnetic circuit operating with an alternating field which includes forming iron powder into a blank of the body and sintering the blank at relatively high temperature, the improvement therein which comprises forming the blank of a relatively coarse iron powder havng a particle size of from about 0.06 to about 0.4 mm., and sintering the blank at a temperature of between about 700° C. and 1150° C. to form a sintered body of relatively coarse particles having relatively low electrical conductivity.

2. In a method as recited in claim 1, the step of cold-forming the thus-sintered blank with a force whose upper limit gives to the blank after cold-forming thereof a specific weight which does not exceed about 7.3 g./cm³.

3. Method of producing a sintered body of relatively high density so as to have a relatively high saturation inductance for use in a magnetic circuit operating with an alternating field which includes forming iron powder into a blank of the body and sintering the blank at relatively high temperature, the improvement therein which comprises forming the blank of a relatively coarse iron powder having a particle size of from about 0.1 and 0.3 mm.; and sintering the blank at a temperature of about between 900° and 1100° C. to form a sintered body of relatively coarse particles having a relatively low electrical conductivity.

4. Method of producing a sintered body of relatively high density so as to have a relatively high saturation inductance for use in a magnetic circuit operating with an alternating field which includes forming iron powder into a blank of the body while applying compressive force thereto and sintering the blank at relatively high temperature, the improvement therein which comprises forming the blank of a relatively coarse iron powder having a particle size of from about 0.06 and 0.4 mm. and compressed so that the blank has a specific weight of from about 6.0 to about 7.0 g./m.³; and sintering the blank at a temperature of about between 700° and 1150° C. to form a sintered body of relatively coarse particles having a relatively low electrical conductivity.

5. Method of producing a sintered body having a relatively high saturation inductance for use in a magnetic circuit operating with an alternating field which includes forming iron powder into a blank of the body while applying compressive force thereto, and sintering the blank at relatively high temperature, the improvement therein which comprises forming the blank of a relatively coarse iron powder having a particle size of from about 0.1 and 0.3 mm. and compressed so that the blank has a specific weight of from about 6.0 to about 7.0 g./m.³; and sintering the blank at a temperature of about between 900° and 1100° C. to form a sintered body of relatively coarse particles having a relatively low electrical conductivity.

References Cited

UNITED STATES PATENTS

| 3,120,699 | 2/1964 | Russo | 148—105 X |
| 2,759,810 | 8/1956 | Koehler | 29—182 X |
| 3,306,742 | 2/1967 | Adams | 75—214 X |

FOREIGN PATENTS

| 917,698 | 2/1963 | Great Britain. |
| 1,076,158 | 2/1960 | Germany. |

OTHER REFERENCES

Delisle: "Bonding Metal Particles by Heat Alone Without Pressure." The electrochmical society preprint 85–16, Apr. 17, 1944, pp. 171, 174, 175.

Goetzel: "Treatise on Powder Metallurgy," vol. II, 1950, pp. 272, 273, 280, 284–287–, 312, 313.

BENJAMIN R. PADGETT, *Primary Examiner.*

A. J. STEINER, *Assistant Examiner.*

U.S. Cl. X.R.

75—200